United States Patent [19]

Terasawa

[11] Patent Number: 4,823,303

[45] Date of Patent: Apr. 18, 1989

[54] DISPLAY CONTROL APPARATUS FOR USE IN COMPOSITE DOCUMENT PROCESSING APPARATUS

[75] Inventor: Michiyuki Terasawa, Iruma, Japan

[73] Assignee: Kabushiki Kaisha Toshiba, Kawasaki, Japan

[21] Appl. No.: 73,744

[22] Filed: Jul. 15, 1987

[30] Foreign Application Priority Data

Jul. 17, 1986 [JP] Japan .................... 61-166743

[51] Int. Cl.$^4$ ............................. G06F 15/72
[52] U.S. Cl. ........................... 364/521; 340/721; 340/724; 340/734; 340/747; 364/523
[58] Field of Search ................ 364/518, 521, 523; 340/721, 724, 799, 734, 723, 731, 747

[56] References Cited

U.S. PATENT DOCUMENTS

| | | | |
|---|---|---|---|
| 4,417,239 | 11/1983 | Demke et al. | 340/709 |
| 4,428,065 | 1/1984 | Duvall et al. | 364/900 |
| 4,546,349 | 10/1985 | Prohofsky et al. | 340/731 |
| 4,684,935 | 8/1987 | Fujisaku et al. | 340/717 |
| 4,723,210 | 2/1988 | Barker et al. | 364/300 |

Primary Examiner—Gary V. Harkcom
Assistant Examiner—Randy W. Lacasse
Attorney, Agent, or Firm—Cushman, Darby & Cushman

[57] ABSTRACT

A composite document processing apparatus has a central processing unit (CPU), a document memory to store data of a composite document, an attribute memory to store attribute data, such as the location in the composite document, the area size and the type of each data stored in the document memory, a window/viewport memory to store display attribute data, such as the size of a window and the size of a viewport, and a video memory to store display data in an image form. The composite document processing apparatus further includes a display device, on which first and second viewports are defined. Based on the above two types of attribute data, the CPU contracts the display data in a first window area, which is set for the entire document stored in the document memory, and develops the data in the video memory in an image form in such a manner that the display area in the first window area is displayed in the first viewport, which defines a display area smaller than the first window area. Based on these attribute data, the CPU also performs an equal enlargement or a greater enlargement of the contents of a second window area and develops the enlarged data in the video memory in an image form so that this data can be displayed in the second viewport, and responds to the updating of the contents of the second viewport to update the corresponding portion of the first viewport in real time.

4 Claims, 4 Drawing Sheets

DISPLAY CONTROL APPARATUS FOR USE IN COMPOSITE DOCUMENT PROCESSING APPARATUS

BACKGROUND OF THE INVENTION

This invention relates to a composite document processing apparatus, which prepares a composite document containing different types of information, such as texts, figures and images, with the aid of windows, viewports and icons.

Generally speaking, document editing devices that use a display unit are restricted by the size of a display buffer, so that the entire document may not be displayed at one time. To cope with this problem, therefore, a layout display has been employed, to show where in the document the data that is currently being entered or editing is being performed.

According to a conventional layout display technique, only the characters that partly constitute a document to be displayed are displayed, using special symbols, irrespective of the size of each character. This type of layout display technique simply provides a rough indication of the character layout for the entire document.

There is another conventional layout display technique, which can show the character layout using special symbols as per the first conventional layout display technique, and can also provide the layout of an image or a graph using solid lines in such a noncharacter region. Recently, composite document processing apparatuses have been provided with the ability to vary the dot pitch, line pitch and character size, and have become increasingly popular. Therefore, there is a growing demand for a layout display that allows an operator to confirm different pitches and different character sizes as well. Furthermore, development of a multi-window technique includes a number of images and graphs of various sizes in a document. In this respect, therefore, there is a further demand for a layout display that can handle multifarious images and graphs.

SUMMARY OF THE INVENTION

With the above in mind, it is an object of this invention to provide a composite document processing apparatus which ensures a clear layout of texts, images and graphs of various types.

This object is achieved by providing a display control apparatus for a composite document processing apparatus, which comprises:
  document data storage means for separately storing different types of data, such as character code data, image data and graphic data, which constitute a composite document;
  data attribute storage means for storing attribute data of each data stored in the document data storage means, the attribute data including a location on the composite document, an area size and a type of said each data stored in the document data storage means;
  window/viewport storage means for storing attribute data including a window size and a viewport size;
  display data storage means for storing image-formation display data;
  display means for displaying the image-formation display data; and
  control means for developing the data stored in the document data storage means into the display data storage means in an image form in accordance with the attribute data stored in the data attribute storage means and the attribute data stored in the window/viewport storage means, the control means including:
    first display control means for reducing all of the composite document or an arbitrary portion of the composite document in such a manner that the size of display data on a first window, indicating a region where the data in the document data storage means is to be displayed, falls within a first viewport for indicating a display region on the display means in which the display data on the first window is displayed, and for developing the reduced document data in the display data storage means in an image form, thus providing a reduced display to the display means,
    second display control means for performing an equal enlargement or a greater enlargement of a second window, having at the maximum the same size as the first window, and display data within the second window in such a manner that the second window falls within a second viewport corresponding to the second window, and for developing the enlarged display data in the display data storage means in an image form, thereby providing an enlarged display to the display means, and
    third display control means for responding to the updating of data displayed by the second display control means to update that data displayed on the first viewport which corresponds to the updated data in real time.

The composite document processing apparatus of this invention can store character code data, image data and graphic data separately in the respective memory areas, and can reduce these data and develop them in an image form. Accordingly, it is possible to provide a direct reduced layout of the entire composite document. This makes it easier for an operator to grasp the overall layout of the composite document and thus significantly facilitates the editing procedure.

DETAILED DESCRIPTION OF THE PREFERRED EMBODIMENTS

Figure 1:
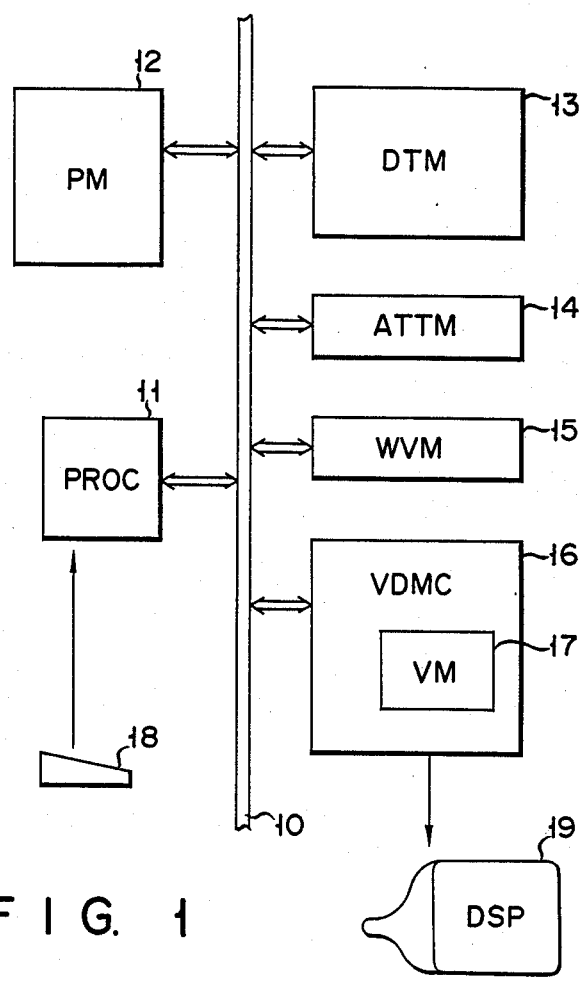
FIG. 1 is a block diagram illustrating a composite document processing apparatus according to an embodiment of this invention.

FIG. 1 is a block diagram showing a composite document processing apparatus according to an embodiment of this invention. Processor 11, which is coupled to a program memory 12 via common bus 10, executes a control program stored in program memory 12. Processor 11 is also coupled to input device 18, such as a keyboard or a mouse. Document data, such as characters, graphs and images, are stored into document memory 13. Attribute memory 14 stores various attribute data, including the location in a document, the area size and the type of each data. Window/viewport memory 15 stores window data, which indicates the display position of the document in document memory 13, and viewport data, which indicates where on display unit 19 data would be displayed when instructed (display location) and how large the data would be developed (data development/display size). Video data memory controller 16 controls the display timing for display unit 19. Video data memory controller 16 has video data memory 17, which has a memory capacity greater than the maximum number of dots displayable by display unit 19 and stores display data corresponding to the raster of display unit 19. Display unit 19 may be constituted by a cathode ray tube. Processor 11, program memory 12, document memory 13, attribute memory 14, window/viewport memory 15 and video data memory controller 16 are mutually coupled through common bus 10.

Figure 2:
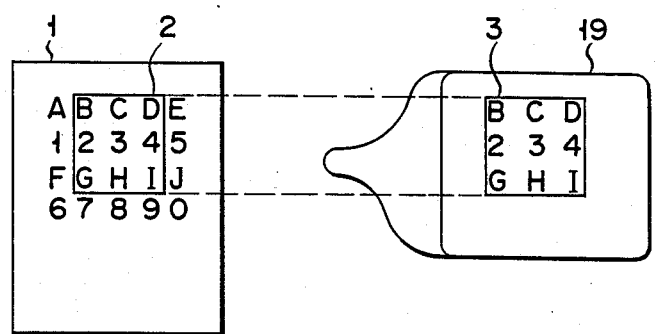
FIG. 2 is a diagram showing the relationship between a window and a viewport in the embodiment of FIG. 1.

FIG. 2 illustrates the relationship between a window and a viewport. Window 2 indicates which portion of document 1 stored in document memory 13 is to be displayed. Viewport 3 indicates where on display unit 19 the portion of document 1 is displayed.

Figure 3:
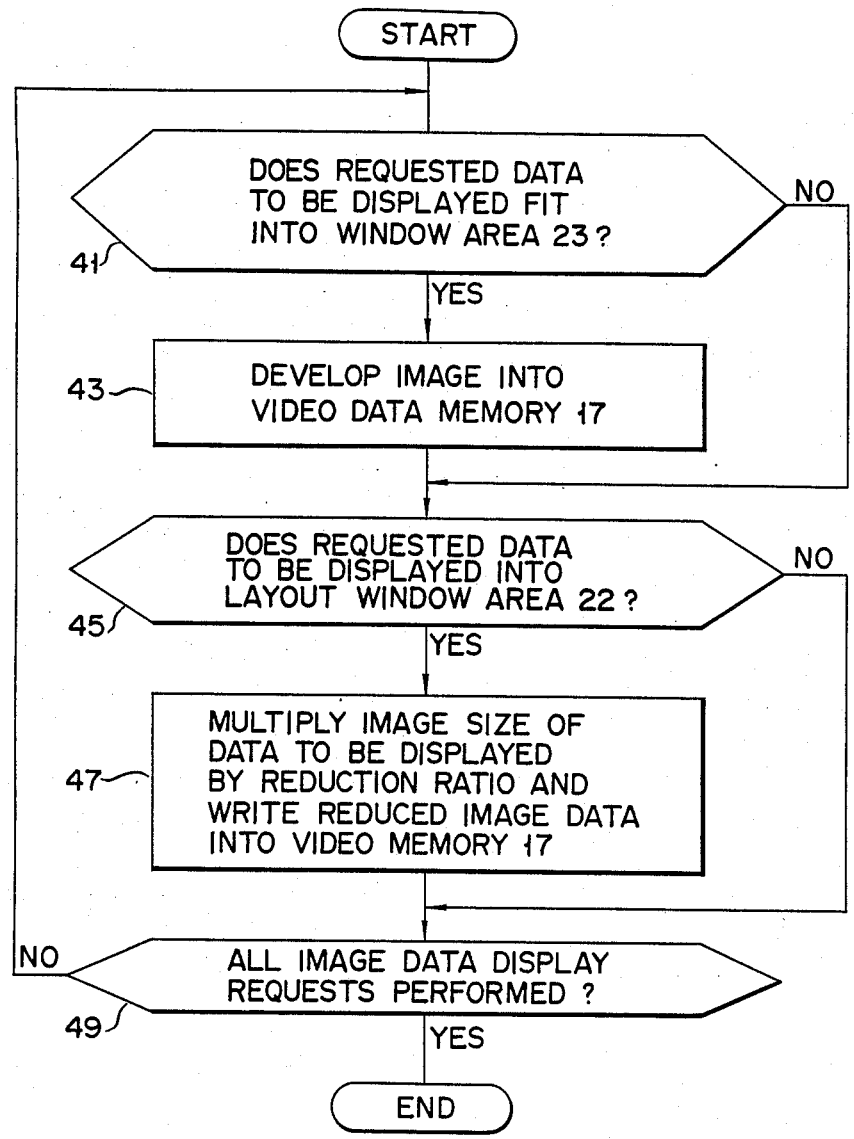
FIG. 3 is a flowchart illustrating the operation of the embodiment of FIG. 1.
Figure 4:
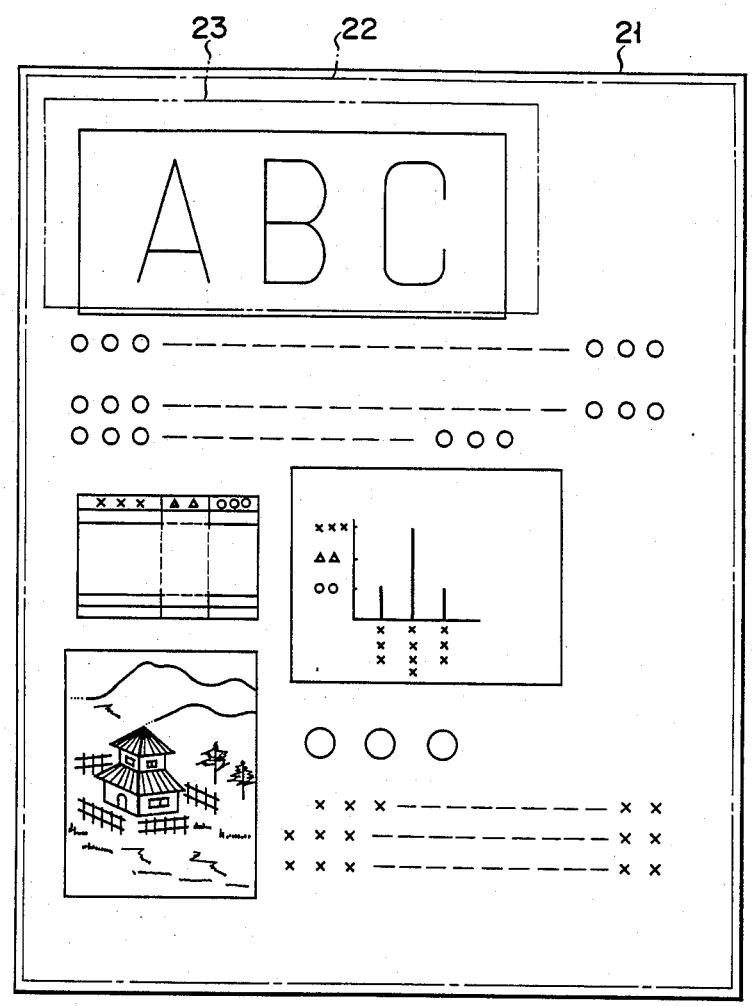
FIG. 4 is a diagram showing an example of a document prepared by the embodiment of FIG. 1.
Figure 5:
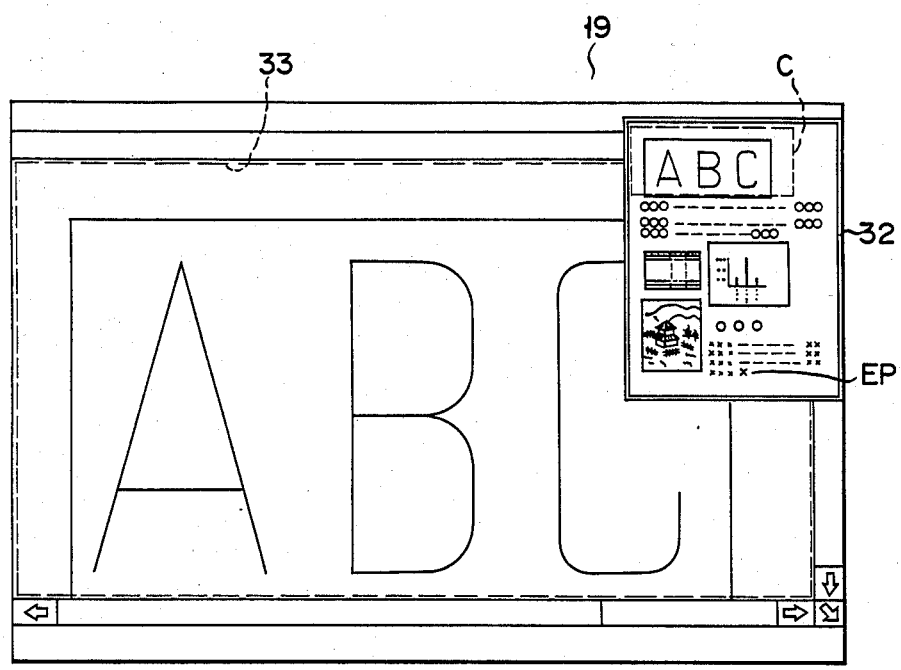
FIG. 5 is a diagram exemplifying how the document shown in FIG. 4 would be displayed according to the embodiment of FIG. 1.

Referring now to FIGS. 3 through 5, the operation of the embodiment of this invention will be explained. FIG. 4 is an overall view of an example of a document stored in document memory 13. The entire document is indicated by reference numeral "21", and two windows are indicated by reference numerals "22" and "23", respectively. When a viewport is made smaller than the associated window, it provides a reduced display of the window. On the other hand, when the viewport is larger than the window, it provides an enlarged display of the window.

As should be clear from FIG. 5, viewport 33 provides an enlarged display of window 23 shown in FIG. 4, while viewport 32 provides a reduced display of window 22 (FIG. 4). Current display frame C in viewport 32 indicates where in viewport 32 viewport 33 is actually located. A mark denoted by "EP" in viewport 32 indicates where in the document the next character is to be entered.

In response to an entered data display request, processor 11 reads out attribute data from attribute memory 14 and window data from window/viewport memory 15. These attribute data and window data are needed for processor 11 to perform an internal processing, so that they are not displayed for an operator. Based on the attribute data and window data, processor 11 reads out document data from document memory 13 and develops it in video data memory 17 into an image form.

The following explains this image-formation data storage operation, referring to the flowchart of FIG. 3.

First, it is determined in step 41 whether or not the display data read from document memory 13 is of a size small enough to fall within data window area 23. If the determination is affirmative in step 41, processor 11 develops, or writes, image data corresponding to the display data into video data memory 17. In this case, the size of the viewport shown in FIG. 5 is set equal to or larger than the size of the associated window shown in FIG. 4. (Viewport 33 in FIG. 5 is set larger than window 23 in FIG. 4 for a higher resolution.) On the other hand, if the determination in step 41 is negative, the operation advances to step 45 where processor 11 determines whether or not the display data from document memory 13 falls within layout window area 22. If the determination is affirmative in step 45, the display data is developed, into an image form in video data memory 17, either at an unchanged size or a contracted size. That is, it may be necessary to reduce the size of window 22 shown in FIG. 4 to the size of viewport 32. In this case, the reduction factor is obtained by dividing the viewport size by the window size. Processor 11 multiplies the data development/display size read from window/viewport memory 15 by the reduction factor and then develops an image of the display data in video data memory 17, accordingly. Processor 11 then advances to step 49 to determine whether or not a data display request is completed. If the request is not completed, processor 11 returns to step 41 and repeats operational steps 41 through 49.

The above operation would provide the display screen shown in FIG. 5. When requested display data is developed in video data memory 17, the display data is enlarged or reduced on the basis of the window data and viewport data which are stored in window/viewport memory 15. When that portion of a document which lies where two windows overlap each other, processor 11 performs the image development on two associated viewports almost at the same time, so that the display data would be updated in real time on the layout viewport.

What is claimed is:

1. A display control apparatus for a composite document processing apparatus, comprising:

document data storage means for separately storing different types of data, including character code data, image data and graphic data, which together constitutes a composite document;

data attribute storage means for storing attribute data for each data stored in said document data storage means, said attribute data including a location in said composite document, an area size and a type of said each data stored in said document data storage means;

window/viewport storage means for storing attribute data including a window size and a viewport size;

display data storage means for storing image-formation display data;

display means for displaying said image-formation display data; and control means for writing said data stored in said document data storage means into said display data storage means in an image form in accordance with said attribute data stored in said data attribute storage means and said attribute data stored in said window/viewport storage means, said control means including:

first display control means for reducing all of said composite document or an arbitrary portion of said composite document responsive to a size of a first window, indicating a region of said document data storage means where data is to be displayed, and a first viewport for indicating a display region of said display means on which said display data on said first window is to be displayed, said reducing being such that said first window falls within said first viewport, and for writing said reduced document data into said display data storage means in an image form, thus providing a reduced display to said display means when said reduced document data is read therefrom, second display control means for performing an equal enlargement or a greater of a second window, which has as a maximum size the same size as said first window, and a display data within said second window, in such a manner that said second window falls within a second viewport corresponding to said second window, and for writing said enlarged display data in said display data storage means in an image form, thereby providing an enlarged display to said display means, and third display control means, responsive to an updating of data by said second display control means for updating, in real time, data displayed on said first viewport which corresponds to updated data.

2. The apparatus according to claim 1, wherein said first display control means for indicating where in said first viewport contents of said second viewport lie.

3. The apparatus according to claim 1, wherein said first display control means includes means for indicating an input location of the next data.

4. A composite document processing apparatus comprising:

data input means including a keyboard and a mouse;

document data storage means for separately storing different types of data, including character code data, image and graphic data, which together constitute a composite document;

data attribute storage means for storing attribute data of each data stored in said document data storage means, said attribute data including a location on said composite document, an area size and a type of said each data stored in said document data storage means;

window/viewport storage means for storing attribute data including a window size and a viewport size;

display data storage means for storing image-form display data;

display means for displaying said image-form display data; and a central processing unit for storing data entered from said data input means into said document data storage means, for reducing all of said composite document or an arbitrary portion of said composite document responsive to a size of a first window, indicating a region where said data in said document data storage means is to be displayed, and a first viewport for indicating a display region on said display means in which said display data on said first window is display, said reducing occuring such that said display data in said first window falls within said first viewport and for writing said reduced document data in said display data storage means in an image form, thus providing a reduced display to said display means, for performing an equal enlargement or a greater enlargement of a second window, having as a maximum size the same size as said first window, and display data within said second window, in such a manner that said second window falls within a second viewport corresponding to said second window, and for writing said enlarged display data in said display data storage means in an image form, thereby providing an enlarged display for said display means, and for responding to an updating of displayed data to update, in real time, that data displayed on said first viewport which corresponds to updated data.

* * * * *